United States Patent

Fencl

Patent Number: 5,221,551
Date of Patent: Jun. 22, 1993

[54] DRY FOOD MIX AND METHOD

[75] Inventor: Susan D. Fencl, Mahopac, N.Y.

[73] Assignee: Kraft General Foods, Inc., Northfield, Ill.

[21] Appl. No.: 798,380

[22] Filed: Nov. 26, 1991

[51] Int. Cl.$^5$ .............................................. A23L 1/24
[52] U.S. Cl. ................................... 426/589; 426/650; 426/804
[58] Field of Search ............... 426/96, 589, 658, 578, 426/613, 804, 650

[56] References Cited

U.S. PATENT DOCUMENTS

| | | | |
|---|---|---|---|
| 2,704,258 | 3/1955 | Haney | 426/589 |
| 2,916,383 | 12/1959 | Nasarevich et al. | 426/589 |
| 4,539,215 | 9/1985 | Schweid et al. | 426/589 |
| 4,596,715 | 6/1986 | Ballard et al. | 426/573 |
| 4,713,255 | 12/1987 | Horan | 426/589 |

OTHER PUBLICATIONS

Staley, Technical Data, Mira-Gel 463 Starch.
Staley, Stir & Sperse Technical Data Nov. 1988.

Primary Examiner—Jeanette Hunter
Attorney, Agent, or Firm—White Plains, NY 10625; Thomas R. Savoie

[57] ABSTRACT

A dry mix and simplified method for preparing a no-oil salad dressing are disclosed. Full oil texture and mouthfeel are imparted to the dressing by a combination of high solids content principally sugar and salt, agglomerated pregelatinized corn starch, xanthan gum and guar gum. The salad dressing is made by simple hand shaking.

11 Claims, No Drawings

DRY FOOD MIX AND METHOD

FIELD OF THE INVENTION

This invention relates to a dry food mix and more particularly to a dry salad dressing mix for home preparation, which can be reconstituted by shaking with vinegar and water, into a dressing having a taste, texture and mouthfeel similar to that of a dressing employing the normal complement of oil used in light oil dressings.

DESCRIPTION OF THE PRIOR ART

Salad dressings are well known in the art and are available as prepared aqueous mixes or can be a dry mix for reconstituting with water, vinegar and oil. Previous full oil or low oil salad dressings employed small amounts of starch and/or gums and were relatively low in soluble solids such as sugar and salt. Previous products were also designed to deliver a fixed viscosity and did not tolerate changes in formulation.

While any number of diverse ingredients can be used in the preparation of salad dressing, oil has almost universally been considered important for its contribution to mouthfeel an overall eating quality. These ingredients can be combined in a myriad of ways to create dressings having thousands of different flavors. In general, however, premium quality salad dressings will typically have oil contents of at least about 50% by volume. The oil in a salad dressing balances the flavor of the dressing and imparts acceptable texture and mouthfeel. The oil is usually the single most caloric component of the dressing. It contributes about 125 calories per tablespoon of oil or between about 63 and 75 calories per tablespoon of dressing.

U.S. Pat. No. 4,596,715, Ballard et al., teaches a reduced calorie dry dressing which when reconstituted by the consumer contains 10-30% by volume of oil.

SUMMARY OF THE INVENTION

We have prepared a dry mix salad dressing to which the consumer adds vinegar and water and may add up to a tablespoon of oil of choice without appreciably changing the final aqueous viscosity of the salad dressing.

We prepare a dry mix containing high levels of soluble solids derived from sugar and salt to which we add starch and a combination of xanthan and guar gum, as well as conventional acidulents, flow agents, spices, flavors, preservatives and the like. The amount of soluble sugar and salt solids is controlled, as well as the amount of added starch and gums to give a finished aqueous dressing viscosity of 700 to 2200 cps.

DETAILED DESCRIPTION OF THE INVENTION

The dry foodstuff of the invention is prepared by blending from 3 to 23% on a weight basis salt, 27 to 57% sugar, usually predominantly sucrose, so that from 52 to 80% of the dry mix solids comprise sugar and salt. From 5 to 11% starch is added with up to 3.4% gums selected from xanthan and guar and usually a mixture of both. Dry ground spices, flavorants, vegetables, acidulents, preservatives and the like are also added. The entire mixture is blended and packaged for sale. The consumer simply adds the dry blend to water and vinegar to prepare a no-oil salad dressing. Up to a tablespoon of oil may be added by the consumer to add a touch of flavor and texture. The mixture is then well shaken and served.

To prepare the dry mix, the dry ingredients are simply dry-blended, such as in a V-blender or a horizontal ribbon blender to achieve uniform distribution. The dry mix is then weighed and packaged in a portion-controlled, moisture proof package.

The dry mix of this invention is capable of preparing a no-oil salad dressing. The dry mix contains from 3 to 23% salt, 27 to 57% sugar with the sugar and salt comprising 52 to 80% of the dry mix, from 5 to 11% starch preferably pregelatinized starch and from 1.0 to 3.4% gums, usually 1.2 to 1.7% xanthan and 1.0 to 1.7% guar. The combination of these five ingredients are critical to the texture of the reconstituted dressing.

The dry mix is simply added to water and acidulent in sufficient quantity to prepare the finished dressing. If desired, a tablespoon of oil can be added for texture and taste.

Simple preparation, and excellent texture and mouthfeel are imparted to the dressing by a novel combination of sugar, salt, starch and gums. In a preferred embodiment, agglomerated, pregelatinized corn starch is used as the pregelatinized starch.

The salad dressing prepared from the dry mix of the present invention is prepared from the dry ingredients, an acidulent such as vinegar, water and optionally a touch of oil, by a process which is suitable for the home, because it involves nothing more complicated than mixing and hand shaking. The dry mix of ingredients, which includes the sugar, salt and starch, the gums, and other dry ingredients, readily mixes, with water and vinegar, free from lumping, to achieve a desirable consistency and eating quality.

The sugar is predominantly sucrose, although other mono or disaccharides or corn syrup solids high in mono and disaccharides may be employed. Up to 50% or more of the sugars are preferably sucrose.

The starch can be pregelatinized starch of any type, although we prefer to employ an agglomerated pregelatinized corn starch. The starch which is used in the dry salad dressing mix of the present invention must be an instant starch, i.e., a starch that forms a gel in cold water. Such a starch is referred to as a cold swelling, pre-cooked starch. Due to the presence of acid in the dressing, the starch should also be acid-stable. Such starches include, but are not limited to, modified starches, such as tapioca starch, corn starch, rice starch, potato starch, waxy maize, and the like.

In a preferred embodiment, suitably modified corn starch is used. The starch is prepared so as to be particularly suitable for use in highly-acidic, cold food processes. An especially preferred formulation of such starch is sold by A. E. Staley Mfg. Co., Decatur, Ill. as "Stir and Sperse" TM which is similar to "Mira-Gel" TM starch but is agglomerated to improve dispersion in acidic water.

The amount of starch which is used is controlled by the consistency desired in the salad dressing. If the amount of starch is too great, the resultant dressing will be thick and lumpy; if the amount is too low, the dressing will be thin and runny. It is generally desirable to use an amount of starch that will maintain the consistency of the salad dressing in the range between these extremes. We have found from 3 to 11% by weight starch is sufficient when combined with the gums, salt and sugar.

The gums used in the practice of the present invention must be water-miscible, easily-dispersible, and stable in acidic solutions. They act in conjunction with the starch to thicken, extend the oily mouthfeel, and give a satisfactory texture to the dressing.

The gums may be any food gum suitable for viscosity building but we prefer a combination of xanthan and guar.

Xanthan gum is particularly useful in the practice of the present invention. It is a high molecular weight polysaccharide and functions as a hydrophilic colloid to thicken, suspend and stabilize emulsions and other water-based systems. An especially suitable formulation of xanthan gum is sold by Kelco Division of Merck & Co., Inc., Rahway, N. J. under the trademark KELTROL® and KELTROL®F.

Guar gum is also useful in the formulation of a no-oil salad dressing. Guar gum is the refined endosperm of the leguminous plant cyamposis tetrasonolobus. It has a bland taste and odor, but is useful as a thickener, stabilizer and bodying agent. Guar gum is sold by Henkel Corporation Food Ingredients Division, Minneapolis, Minn. under the trademark "Supercol" F.

Many other dry ingredients may also be used in the dry mix of the present invention. Although at least one, and generally more, of these other dry ingredients should be used to impart flavor and other qualities to the dressing, the use of any particular ingredient is optional.

All of the dry ingredients which are used must be soluble to the desired degree in water and stable in acidic solutions. Suitable dry ingredients are selected from the group consisting of flavoring agents, stabilizers, flavor enhancers, preservatives, and coloring agents. Some ingredients, such as carrot granules, peppers of various types, parsley and onion are added in insoluble form to impart color as well as flavor.

Examples of flavoring agents include, spices and vegetables such as garlic, onion, black pepper, red bell pepper, carrots, minced green onion, other spices, vegetables and other natural flavors. These flavoring agents may be used in amounts from about 0.1 to about 5.0 grams for each liter of dressing.

Sodium or Potassium citrate is added at up to 15% by weight of the dry mix, preferably up to 10% in order to balance the acid flavor of the dressing.

Suitable flavor enhancers include, but are not limited to monosodium glutamate and substitutes therefore, as well as salt.

Suitable preservatives include, but are not limited to, sodium sulfites, TBHQ and BHA which will be employed in amounts effective for their intended functions.

Flavors, including spices and herbs make up the balance of the dressing.

No oil is included in the mix and the dry mix may be prepared with only vinegar and water to give a fat-free final product. However, the consumer may add up to a tablespoon of oil to enhance the flavor and texture.

In a preferred embodiment, the salad dressing of the present invention is prepared by first combining the vinegar and water in a container. Then the mixture of dry ingredients is added and the container is shaken by hand, e.g., for ten seconds, in order to obtain a uniform dispersion of the ingredients. The oil, if any, is then added and the container is again shaken by hand thoroughly in order to obtain the oil-in-water dispersion which is the salad dressing of the present invention.

As prepared, the salad dressing which has been described has a taste, texture, and mouthfeel similar to those of light oil salad dressing. This is true in spite of the fact that the salad dressing of the present invention has no oil. The caloric value of the salad dressing of the present invention is also significantly reduced.

The prepared salad dressing texture is accomplished by the control of the mix soluble solids, specifically sugar and salt, and by the use of pregelatinized starch, xanthan and guar in critical proportions.

The mix of this invention allows the consumer to control the amount of oil or fat added, if any, and the particular kind of oil employed such as olive oil.

In preparing the salad dressing we employ in relative amounts sixty milliliters (60 ml) of vinegar and thirty milliliters (30 ml) of water and one hundred thirty milliliters (130 ml) of water, milk or mayonnaise depending on the dressing. Up to 15 ml of oil can also be added as part of the 130 ml. Most of our dressings employ 130 additional milliliters of water for a total of one hundred sixty milliliters (160 ml) water as used in the examples. When the consumer adds 15 ml of oil (less than 7% of the final dressing mixture by volume) this amount is one-third the amount added to "lite" dressings and one ninth the amount used in full oil dressings.

Oil in the preparation of dressings contributes viscosity as well as texture and flavor characteristics to the finished dressing. The no-oil formulations employ a unique and critical combination of soluble sugar and salt solids as well as agglomerated pregelatinized starch and a unique combination of Xanthan and quar gum, which together provide a taste, texture and viscosity simulating dressings made with oil. In addition, the formulation is designed to allow the consumer to add oil of choice up to 7% by volume or 15 ml for 225 ml prepared dressing. Not only will the small amount of oil improve the actual flavor and texture of the finished dressings, it allows the consumer to add a touch of their preference in oil to the dressing or to use the preparation free of oil.

Salt and sugar are employed as soluble solids in the dry foodstuff from 52 to 80%, preferably 52 to 70% with salt comprising 3 to 23% and sugar, principally sucrose, comprising 27 to 57%, preferably 27 to 47%.

Starch, particularly pregelatinized starch from any suitable food grade source is acceptable provided it will readily disperse in the water and vinegar aqueous phase. We employ from 5 to 11% starch, preferably agglomerated pregelatinized corn starch.

Gums are employed up to 3.4% of the mix and generally 2 to 3.4% of the mix. The gum can be any suitable gums to build viscosity and give a pleasant mouthfeel such as xanthan, quar and mixtures thereof. We prefer to employ from 1.2 to 1.7% xanthan and from 1.0 to 1.7% quar in combination with the starch.

Herbs, spices, acidulents, flow control agents, preservatives, condiments and the like make up the remainder of the dry mix.

The following examples describe the best mode for preparing the dry mix and then mixing it to form a salad dressing in accordance with the invention. These examples are to clarify this invention, but are not intended to limit the invention in any way.

EXAMPLE 1

The following ingredients are dry blended to prepare a quantity of dry mix for preparing 225 ml of salad dressing.

| Ingredient | % by weight | Weight-gms |
| --- | --- | --- |
| Sucrose | 44.34 | 12.00 |
| Sodium Chloride | 19.40 | 5.25 |
| Starch Staley Stir & Sperse ™ | 11.08 | 3.00 |
| Xantham gum | 1.48 | 0.40 |
| Guar Gum | 1.66 | 0.45 |
| Potassium Citrate | 5.54 | 1.50 |
| Soy Sauce, Dry | 1.33 | .36 |
| Flavor | 7.43 | 2.00 |
| Vegetable & Spice | 7.74 | 2.11 |
| Total | 100.00 | 27.07 |

Sixty (60) milliliters (ml) of vinegar (50 grain) and 160 ml of water are combined in a shaker flask. The mixture of dry ingredients is added and the flask shaken thoroughly by hand for 10 seconds. Up to 15 ml of oil may then be added, if desired to the flask which is then shaken again for 10 seconds. The flask is left to stand at room temperature for 10 minutes. The resultant dressing had good taste, texture and mouthfeel both in an oil-free version and in a version with 15 ml added oil.

EXAMPLE 2

The following ingredients are blended to prepare a quantity of dry mix for preparing 225 ml of salad dressing:

| Ingredient | % by weight | Weight gms |
| --- | --- | --- |
| Sugar | 38.83 | 12.00 |
| Sodium Chloride | 15.04 | 4.65 |
| Starch Staley corn-starch Stir & Sperse ™ | 6.47 | 2.00 |
| Xanthan | 1.29 | 0.40 |
| Guar | 1.46 | 0.45 |
| Potassium Citrate | 6.47 | 2.00 |
| Flavor | 7.12 | 2.20 |
| Whey solids | 6.47 | 2.00 |
| Sour Cream Powder | 3.24 | 1.00 |
| Soy Sauce Powdered | 1.16 | 0.36 |
| Vegetables & Spice | 12.45 | 5.32 |
| Total | 100.00 | 32.38 |

Sixty (60) milliliters (ml) of vinegar (50 grain) and 160 ml of water are combined in a shaker flask. The mixture of dry ingredients is added and the flask is shaken thoroughly by hand for 10 seconds. The flask is left to stand at room temperature for 10 minutes. The resultant dressing had good taste, texture and mouthfeel.

EXAMPLE 3

The following ingredients are blended in a V-blender to prepare a quantity of dry mix sufficient to package a number of dry mix packages for preparing 225 ml of salad dressing:

| Ingredient | % by weight | Weight per package-gms |
| --- | --- | --- |
| Sucrose | 37.06 | 12.00 |
| Sodium Chloride | 18.84 | 6.10 |
| Starch - per Ex. 1 | 9.26 | 3.00 |
| Guar Gum | 1.39 | 0.45 |
| Xanthan | 1.24 | 0.40 |
| Potassium Citrate | 6.18 | 2.00 |
| Flavor | 6.80 | 2.20 |
| Soy Sauce Dry | 1.11 | 0.36 |
| Vegetables & Spice | 18.12 | 5.86 |
| Total | 100.00 | 32.37 |

Sixty (60) milliliters (ml) of vinegar (50 grain) and 160 ml of water are combined in a shaker flask. The mixture of dry ingredients is added and the flask is shaken thoroughly by hand for 10 seconds. The resultant dressing had good taste, texture and mouthfeel.

EXAMPLE 4

The following ingredients were blended by hand to prepare a dry mix sufficient on adding water and acid to prepare 225 milliliters (ml) of salad dressing.

| Ingredient | % by weight | Weight-gms |
| --- | --- | --- |
| Sugar | 37.36 | 17.00 |
| Brown Sugar | 10.99 | 5.00 |
| Honey | 8.79 | 3.99 |
| Sodium Chloride | 5.49 | 2.50 |
| Starch - per Ex. 1 | 6.59 | 3.00 |
| Xanthan Gum | 1.32 | 0.60 |
| Guar Gum | 0.99 | 0.45 |
| Whey Solids | 13.19 | 6.00 |
| Sodium Citrate | 9.89 | 4.50 |
| Flavor | 0.66 | 0.30 |
| Vegetables & Spices | 4.73 | 2.16 |
| Total | 100.00 | 45.50 |

Sixty (60) milliliters (ml) of 50 grain vinegar and 160 milliliters (ml) of water are combined in a flask and the dry ingredient mix, set forth previously added to it. The mixture is vigorously shaken for 20 seconds which is sufficient to prepare a good tasting oil-free salad dressing. If desired 15 ml of oil may be added for taste and texture and the flask shaken again for 10 to 20 seconds. Small amounts of oil may be so added without appreciable changing the final products viscosity or texture.

The practice of the invention is not intended to be limited in any way by whether a small portion of oil is added. When oil is added it should be liquid at room temperature, and preferably at refrigerator temperature. Suitable oils that can be used include, corn oil, peanut oil, safflower, sesame oil, sunflower oil, olive oil, soybean oil, and the like.

Any type of edible acidulent, preferably vinegar, may be used in the practice of the present invention and the practice of the invention is not limited in any way by the type of vinegar or other acidulent which is used. A distilled white vinegar (e.g., 50 grain) can be employed. Other suitable vinegars include, but are not limited to, wine vinegar, cider vinegar, tarragon vinegar and the like. Preferably, the salad dressing will include from about 200 to about 300 ml of vinegar for each liter of salad dressing.

Although the present invention has been described some detail by way of illustration and example for purposes of clarity and understanding, it will, of course be understood that various changes may be made in details of the ingredients used without departing from the scope of the invention, which is defined as set forth in the appended claims.

We claim:

1. A dry mix for preparing an oil free or up to 7% by volume of oil salad dressing having a viscosity of from 700 to 2200 cps containing water, an edible acid and flavors, vegetables and spices, said dry mix comprising from 52 to 80% sugar and salt solids consisting of from 3 to 23% salt and 27 to 57% sucrose, 5 to 11% pregelatinized starch and from 1.0 to 3.4% gum.

2. The foodstuff of claim 1 wherein the gums comprise from 40 to 60% each of xanthan and guar.

3. The foodstuff of claim 1 wherein the starch is an agglomerated, pregelatinized, acid-stable starch.

4. The foodstuff of claim 1 which comprises a salad dressing mixture of from, 5 to 11% agglomerated pregelatinized starch, and from 2.0 to 3.4% gum containing from 40 to 60% each of xanthan gum and guar gum.

5. The salad dressing of claim 4 which contains from 1.2 to 1.7% xanthan and from 1.0 to 1.7% guar.

6. The salad dressing of claim 4 which contains from 52 to 70% solids selected from the group of sugar and salt.

7. The salad dressing of claim 6 in which the sugar content is from 27 to 47%.

8. A method of preparing a salad dressing comprising adding the dry mix of claim 1 to a mixture of vinegar, water and up to 7% by volume of oil and shaking to prepare a low or no oil dressing.

9. The method of claim 8 wherein the salad dressing comprises 5–11% agglomerated pregelatinized starch, up to 1.7% xanthan gum and up to 1.7% guar gum and wherein the total gum content is from 2 to 3.4% by weight of the dry salad dressing mix.

10. The method of claim 8 wherein the prepared salad dressing contains no oil.

11. The method of claim 8 wherein the prepared salad dressing contains oil.

* * * * *